United States Patent
Mahler et al.

(10) Patent No.: US 7,761,993 B2
(45) Date of Patent: Jul. 27, 2010

(54) METHOD FOR INCREASING THE FATIGUE LIFE OF A BLADE ROOT OF A TURBOMACHINE BLADE

(75) Inventors: Alexander Mahler, Kreuzlingen (CH); Jian Chen, Brugg (CH)

(73) Assignee: Alstom Technology Ltd, Baden (CH)

( * ) Notice: Subject to any disclaimer, the term of this patent is extended or adjusted under 35 U.S.C. 154(b) by 243 days.

(21) Appl. No.: 11/838,482

(22) Filed: Aug. 14, 2007

(65) Prior Publication Data

US 2008/0019837 A1    Jan. 24, 2008

Related U.S. Application Data

(63) Continuation of application No. PCT/EP2006/050796, filed on Feb. 9, 2006.

(30) Foreign Application Priority Data

Feb. 15, 2005    (CH) .................................... 0259/05

(51) Int. Cl.
- *B21D 15/00* (2006.01)
- *B21D 53/78* (2006.01)
- *B21J 7/16* (2006.01)
- *B23P 6/00* (2006.01)
- *B23P 19/04* (2006.01)

(52) U.S. Cl. .................. 29/889.7; 29/889.1; 29/402.19; 29/402.05; 72/76; 72/110

(58) Field of Classification Search ................ 29/889.7, 29/889.1, 402.05, 402.19; 72/76, 110

See application file for complete search history.

(56) References Cited

U.S. PATENT DOCUMENTS

| 5,666,841 A | * | 9/1997 | Seeger et al. .................. 72/110 |
| 2004/0064945 A1 | | 4/2004 | Howley | |

FOREIGN PATENT DOCUMENTS

| DE | 4309176 | 9/1994 |
| DE | 19516834 | 11/1996 |
| GB | 2406532 | 4/2005 |
| JP | 57168006 | 10/1982 |
| SU | 1754422 | 8/1992 |

* cited by examiner

*Primary Examiner*—David P Bryant
*Assistant Examiner*—Alexander P Taousakis
(74) *Attorney, Agent, or Firm*—Leydig, Voit & Mayer, Ltd.

(57) ABSTRACT

A method for increasing the fatigue life of a blade root of a turbomachine blade, wherein the blade root has at least one slot for back-gripping fixing of the blade root in a shaft component or a casing component of a turbomachine. The method comprises impressing a mechanical stress field in the notch root in a section of the slot, wherein the impressed mechanical stress field brings about a plastic deformation of the notch root. The impressed mechanical stress field is then progressively moved in the slot longitudinal direction of the slot. After this, the impressed mechanical stress field is removed again, wherein residual compression stresses remain in the notch root of the slot in the region of the slot in which the mechanical stress field was impressed.

9 Claims, 5 Drawing Sheets

METHOD FOR INCREASING THE FATIGUE LIFE OF A BLADE ROOT OF A TURBOMACHINE BLADE

This application is a continuation of International Patent Application No. PCT/EP2006/050796, filed on Feb. 9, 2006, which claims priority to Swiss Patent Application No. CH 259/05, filed on Feb. 15, 2005. The entire disclosure of both applications is incorporated by reference herein.

The present invention relates to a method for increasing the fatigue life of a blade root of a turbomachine blade. Furthermore, the invention refers to a turbomachine blade with an increased fatigue life of the blade root of the turbomachine blade.

BACKGROUND

The blade roots of turbomachine blades are exposed to high mechanical loads during operation of the turbomachine. This especially applies to the blade roots of rotor blades, via which roots the flow-induced forces which act upon the respective blade during operation, and also the centrifugal forces which act upon the respective blade, are diverted into the adjoining shaft components. In addition to mechanical loads, high thermal loads additionally occur, particularly in turbine blades.

The inverted T-root type of construction, and also the firtree type of construction, are blade root types of construction which are known from the prior art and which are largely common. In the blade root, which in most cases is formed in a triangular shape, at least one slot for a back-gripping fixing in an adjoining component is arranged in each case on the two free sides of the triangle. The component which adjoins the blade root in the assembly arrangement of the turbomachine has a recess which corresponds to the contour of the blade root, for positive-locking retention of the blade root. Ribs or thickenings which engage in the slots of the blade root in the assembly arrangement, are arranged in the recess of the component. The blade root of the blade, therefore, can be inserted in a positive locking manner in the recess of the component, and is fixed in the component by means of the ribs or thickenings which engage in a back-gripping manner in the slots.

The forces which act upon the blade during operation of the turbomachine, therefore, are transmitted to a significant extent to the respectively adjoining component via the surface abutment which occurs in the pairings of slot/rib or thickening. However, the slots which are arranged in the blade root, at the same time lead to a local weakening of the blade root on account of notch effect. Fatigue phenomena of the blade roots, therefore, often occur first in the region of the slots. Crack formations occur in this case. The relevant blade then has to be overhauled or exchanged. The service life of the blade, therefore, is frequently limited by the maximum continuous load bearing capability of the blade root in the region of the slots.

Indeed, it was sought to improve the continuous load bearing capability of the blade roots by means of known surface treatments, like, for example, sandblasting or shot-peening, or coating of the surfaces. By means of these surface treatments, the surfaces can indeed be hardened, so that these are loadable by higher surface loads, especially also by momentarily higher local loads. The fatigue phenomena, which are caused by low-frequency alternating or vibrating loads, which represent a significant cause for the creation of fatigue crack formations, cannot be improved, however, as a result of this.

SUMMARY OF THE INVENTION

An object of the present invention is to provide a method for increasing the fatigue life of a blade root of a turbomachine blade, by which the disadvantages of the prior art are reduced or avoided. In particular, the method according to the invention is to be conducive to increasing the fatigue life of blade roots of turbomachine blades, especially of inverted T-roots. Furthermore, by means of the invention, a turbomachine blade with increased fatigue life of the blade root of the turbomachine blade is to be provided.

For back-gripping fixing in a shaft component or a casing component of a turbomachine, the blade roots which, from the point of view of the invention, for example are formed in each case as an inverted T-root, as known from the prior art, are equipped with a slot. The method according to the invention then comprises impressing a mechanical stress field in the notch root of the slot in at least one section of the slot, wherein the impressed mechanical stress field brings about a plastic deformation of the notch root. The material layer of the blade root which is adjacent to the surface of the slot is referred to as the notch root. The mechanical stress field which is impressed in the notch root of the slot is then progressively moved in the slot longitudinal direction of the slot, as a result of which a plastic deformation of the notch root is brought about in each covered section of the slot. The impressed mechanical stress field is then removed again, wherein residual compression stresses remain in the notch root of the slot within the regions of the slot in which the mechanical stress field was impressed.

The impressed mechanical stress field is expediently progressively moved along the entire length of the slot, so that after removing the impressed mechanical stress field, residual compression stresses remain in the notch root over the entire length of the slot.

By means of the method according to the invention, therefore, a remaining residual compression stress field is induced in the notch root of the slot. During operation of the blade, this remaining residual compression stress field is superposed by the operation-induced stresses which arise as a result of the forces which act upon the blade. The tensile loads which act upon the notch root during operation are compensated at least partially, or even completely, by means of the remaining residual compression stress field, so that a significantly lower tensile stress is established in the notch root. Compressive loads which act upon the notch root during operation are indeed added to the residual compression stresses of the residual compression stress field. It is apparent, however, that compressive loads have only a slight influence on fatigue phenomena of the material of the blade root. Therefore, with the same load situation, this altogether leads to a lower fatigue of the blade root as a consequence of alternating loads of the slot material. The turbomachine blade, therefore, can be used over a longer operating period. This leads to lower maintenance costs and also to increased service lives of the turbomachine.

In contrast to methods which are known from the prior art for increasing the endurance limit at complete stress reversal of a component, like, for example, the known shot-peening of a component, the fatigue life of a blade root can especially also be increased by means of the method according to the invention when the load which occurs in operation does not exceed the fatigue strength-load limit. Conventional methods for increasing the endurance limit at complete stress reversal would in this case lead to no increase of the service life. This is explained by the fact that conventional methods, for example shot-peening, are effective to a material depth of at most about a millimeter beneath the surface of the workpiece. As a result of this, therefore, only a surface hardening is brought about. With the method according to the invention, however, plastic deformations of several millimeters deep, especially about 3 to 5 millimeters deep, are introduced into the component. As already explained above, by means of plastic deformation during the machining process in the slot base, a compressive stress is impressed on the blade root, which leads to alternating tensile stress loads, which act upon the blade root during operation, no longer being unilaterally effective as pure tensile load, but some of the stress amplitude occurring as compressive alternating stress. The residual compression stress field is ideally selected so that the load cycles in operation occur symmetrically. As a result of this, the usable stress reversals are finally noticeably increased. At the same time, the endurance limit at complete stress reversal, however, is additionally also increased as a side effect.

For impressing the mechanical stress field, an impressing tool is preferably pressed into the slot with a defined impressing force. By means of pressing in of the impressing tool into the slot, a stress field is built up in the notch root, which, after removing the impressing force, leads to a residual compression stress field which remains in the notch root. By application of the impressing tool and pressing in of the impressing tool with a defined impressing force, a defined and constant residual compression stress field can thus be produced in a reproducible manner over the entire slot.

According to an expedient development of the invention, an impressing profile of the impressing tool is formed in a contour-conforming manner, or basically contour-conforming manner, to the contour of the slot, as viewed in cross section. The impressing tool which is formed in this way is evenly, or basically evenly, pressed into the slot. As a result of this, a compression hardening of the notch root occurs. This means that during pressing in of the impressing tool basically only compressive loads are present over the entire cross section of the notch root. After finishing the impressing process, a residual compression stress field remains in the notch root.

According to an expedient development of the invention, the impressing profile of the impressing tool has at least one impressing projection. The impressing projection, for example, can be formed as a local point, by which the impressing tool is locally impressed into the notch root of the slot. As a result of this, a compression hardening of the notch root occurs. As a result of the plastic deformation of the notch root, a residual compression stress field remains in the notch root after finishing the impressing process.

According to a further expedient development of the invention, the impressing profile, however, can also be trapezoidally formed, with a broad trapezium base side, a narrow trapezium base side, and also two trapezium sides. The trapezium is generated so that in an impressing arrangement the narrow trapezium base side penetrates furthest into the slot, however does not contact the notch root of the slot. The broad trapezium side, however, is constructed broad to the extent that the trapezium sides, which are formed as connecting surfaces between the broad trapezium base side and the narrow trapezium base side, come to bear upon the slot shoulders of the slot. During pressing in of the impressing profile into the slot, the impressing force is introduced across the slot shoulders, and as a result of this the slot is spread. After finishing the impressing process, an extensive or complete cancelling of the deformation occurs on account of the elastic forces of the material of the blade root. In the notch root, however, a residual compression stress field remains.

In an expedient development of the invention, the mechanical stress field, which is impressed in the notch root of the slot, is progressively moved along the slot by means of rolling or revolving of the impressing tool. The blade root is preferably translationally displaced synchronous to the rolling process of the impressing tool and matched to this.

The impressing tool, for example, can be constructed as an impressing wheel. By means of the impressing tool, which is constructed as an impressing wheel, a defined impressing force can be produced in a simple manner and can be progressively moved along the entire slot.

The defined impressing force is expediently determined in dependence upon the maximum alternating or vibrating load of the blade root which occurs during operation of the blade, upon the material of the blade root, and also upon the contour of the impressing tool.

Thus, it has become apparent, for example, that it is expedient with a blade root which is produced from a nickel-based alloy to deform the notch root of the slot by means of the impressed stress field in a range of between 5% and 12% of plastic strain. By means of a plastic strain of the material of the notch root within this preferred range, a sufficiently high residual compression stress field is formed after finishing the impressing process to adequately compensate tensile stresses which occur during operation of the blade. On the other hand, an overstrain of the material of the notch root as a result of the impressing process is avoided.

With a blade root which is produced from a titanium alloy, it is expedient to deform the notch root of the slot by means of the impressed stress field in a range of between 4% and 8% of plastic strain. By means of a plastic strain of the material of the notch root within this preferred range, a sufficiently high residual compression stress field is formed after finishing the impressing process to adequately compensate tensile stresses which occur during operation of the blade. On the other hand, an overstrain of the material in the notch root as a result of the impressing process is avoided.

The method according to the invention is preferably used during the production of blades for turbomachines or turbogroups, like, for example, gas turbines or steam turbines, or also during the production of blades for other application purposes. As a result of this, both the overall service life of the blade which is to be produced, and the operating time to an inspection-overhaul of the blade, can be increased.

The method according to the invention, however, can advantageously also be applied to a blade which has already been put into operation and is to be overhauled. As a result of this, both the remaining service life of the blade which is to be overhauled and the length of time to the next inspection-overhaul of the blade can often be increased. It has proved to be very expedient in this case that by means of the method according to the invention for increasing the endurance limit at complete stress reversal of a blade, only the smallest geometry changes of the blade root are brought about. Subsequent machining operations on the blade which is to be overhauled, therefore, are not necessary after implementing the method according to the invention.

In a further aspect, the invention provides a turbomachine blade with a blade root with increased endurance limit at complete stress reversal. The blade root comprises at least one slot which is arranged in the blade root, for back-gripping fixing in a shaft component or a casing component of a turbomachine. For increasing the endurance limit at complete stress reversal of the blade root, the blade root is machined in accordance with the previously described method according to the invention.

The advantages of the turbomachine blade according to the invention, compared with the turbomachine blades which are known from the prior art, are in conformance with the embodiments which are encountered above with regard to the method which is implemented according to the invention.

The turbomachine blade is expediently formed as a rotor blade of a turbomachine, preferably as a compressor rotor blade of a turbomachine. Customarily high centrifugal forces act upon rotor blades during operation of the turbomachine. In addition to high-frequency vibrations, high low-frequency cyclic loads additionally act upon the blade roots of the rotor blades, for example as a result of starting and running down of the turbomachine, and also as a result of load change of the turbomachine. From that point of view, the application of the method according to the invention, especially with rotor blades, leads to a significant reduction of the effective stress load of the blade root and, therefore, to an extension of the service life of the blades.

The blade root of the turbomachine blade is expediently produced from a nickel-based alloy or from a titanium alloy.

The slot which is arranged in the blade root is preferably constructed with a semicircular, or approximately semicircular, contour. By means of a semicircular, or approximately semicircular, contour shape of the slot, a surface loading of the notch root with a largely continuous progression without an abrupt change of the surface loading is ensured. The stress diffusion in the notch root is correspondingly also continuous and without abrupt change.

BRIEF DESCRIPTION OF THE DRAWINGS

The present invention is subsequently explained in detail with reference to two exemplary embodiments illustrated in the drawings, in which.

In the Figures, only the elements and components which are essential for the understanding of the invention are shown.

The exemplary embodiment which is shown is to be purely instructively understood and is to serve for a better understanding, but not for a limitation of the subject of the invention.

DETAILED DESCRIPTION

Figure 1:
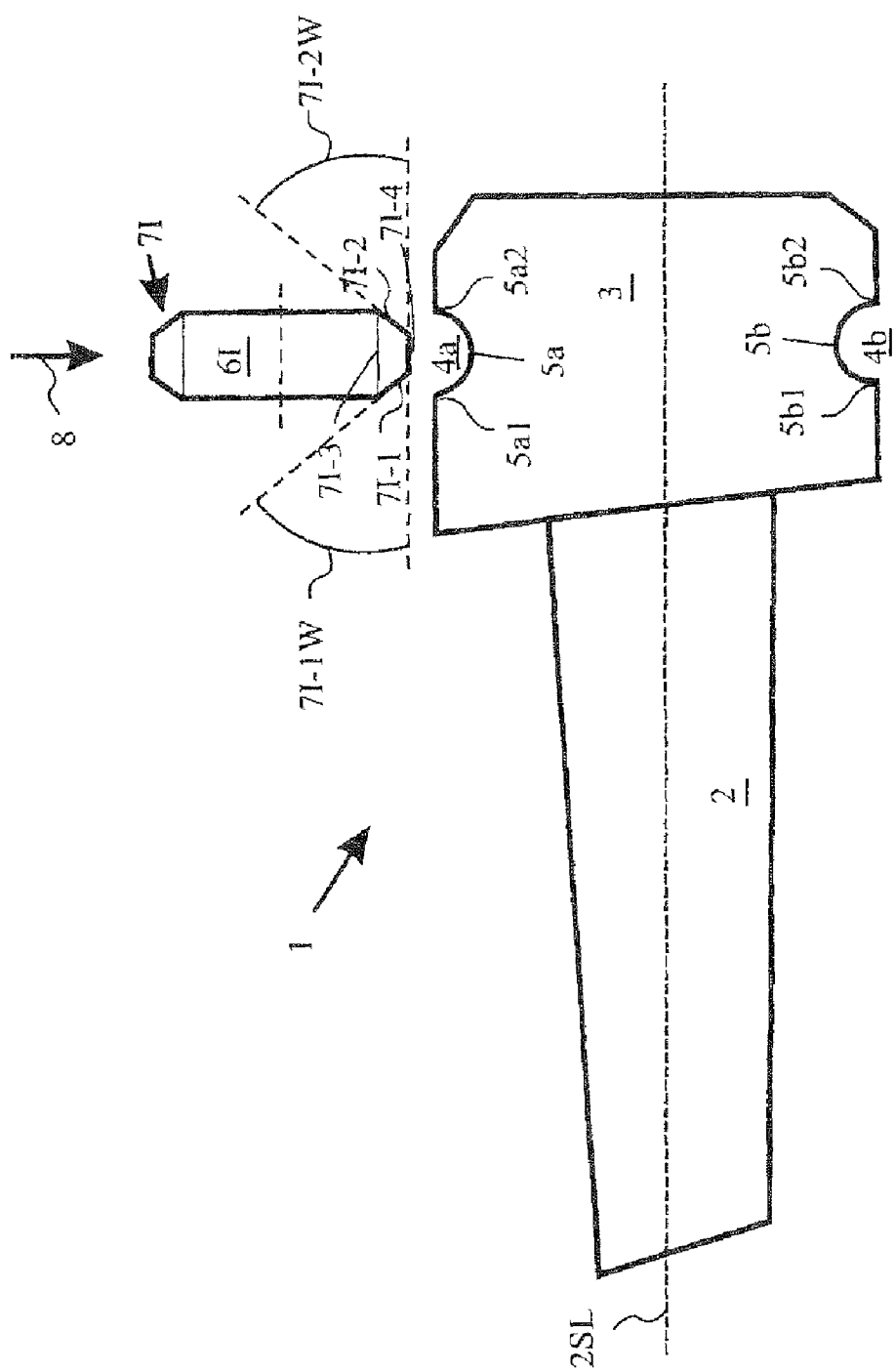
FIG. 1 shows a turbomachine blade with blade root, and also an impressing tool for implementing the method according to the invention for increasing the endurance limit at complete stress reversal of the blade root.
Figure 2:
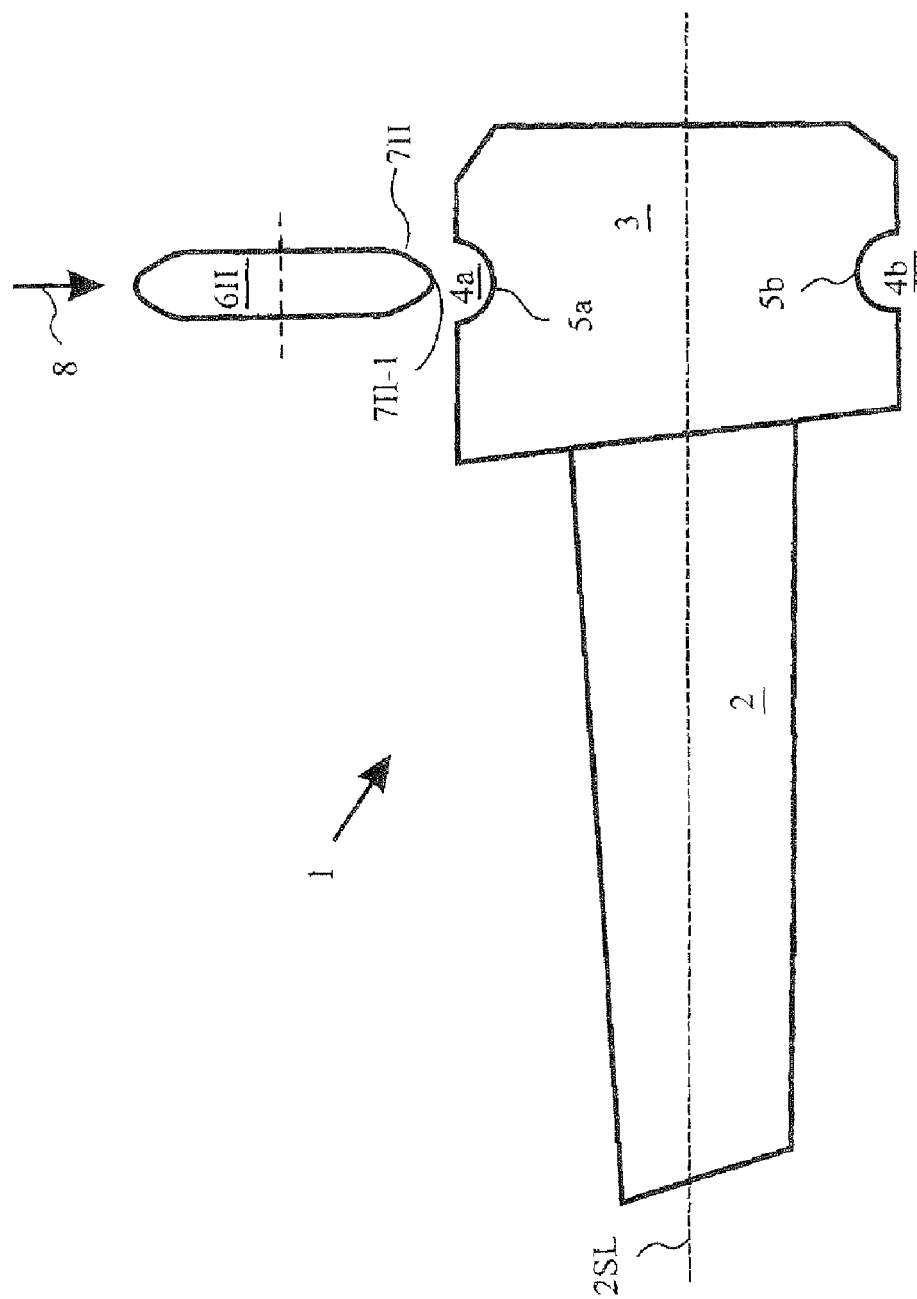
FIG. 2 shows a further turbomachine blade with blade root, and also a further impressing tool for implementing the method according to the invention for increasing the endurance limit at complete stress reversal of the blade root.

In FIGS. 1 and 2, compressor rotor blades 1 of a gas turbine are schematically shown. The blades 1 comprise in each case a blade airfoil 2 and also a blade root 3 which in the blade airfoil longitudinal direction on the root side is connected to the blade airfoil 2. The blade root 3 serves for anchoring the relevant rotor blade 1 in a shaft component of the gas turbine. For this purpose, the blade roots 3 which are shown in FIGS. 1 and 2 and in this case basically cuboidally constructed, have slots 4a, 4b on their broad sides. The slots 4a, 4b, which in each case are formed with a semicircular shape, extend perpendicularly, or basically perpendicularly, to the blade airfoil longitudinal direction 2SL in the width direction of the respective blade root 3. For fixing the blades 1, the shaft components have recesses which conform to the contour shape of the blade roots. Furthermore, fixing ribs are arranged in the recesses of the shaft components and engage in the slots 4a, 4b of the blade roots 3 and in this way fix the blade roots 3 in each case by means of back-gripping positive locking in the blade airfoil longitudinal direction 2SL. Therefore, especially the centrifugal forces which during operation of the blades act upon the respective blade as a result of the rotation of the rotor can be introduced in a favorable manner from the blade into the relevant shaft component. On account of the semicircular contour of the slots 4a and 4b, and also of the fixing ribs which engage in the slots, a continuous stress pattern is produced across the slot contour without abrupt changes of the stress pattern.

For assembly, the blades 1 are customarily inserted from the side into the recesses of the shaft components.

In order to enable a higher surface pressure of the material, especially of the blade root but also of the shaft component in the region of the slots, the blade roots are conventionally frequently sandblasted or shot-peened and/or coated and/or diffusion-hardened. Such a treatment leads to a higher surface hardness, so that the surface can be impacted with a higher static load.

In addition to static loads, however, alternating or vibrating loads additionally also occur during operation of the blades. In this way, low-frequency alternating loads are produced, for example as a result of starting and running down of the turbomachine. In addition, high-frequency cyclic loads of the blades occur. In addition to a maximum permissible static load limit, the service life of the blades is frequently limited because of the maximum permissible number of alternating vibration cycles, the so-called endurance limit at complete stress reversal. This endurance limit at complete stress reversal is further reduced as a result of high thermal loads or additional static loads of the blade root. Furthermore, the slots which serve for fastening and fixing lead in each case to a notch effect in the blade root, which leads to a weakening of the blade root in the region of the slots, especially with regard to the endurance limit at complete stress reversal. Therefore, the service life of the blades is nowadays often limited by the maximum permissible endurance limit at complete stress reversal of the blade root. Upon achieving the maximum permissible number of alternating vibrations, the blade has to be renewed or at least overhauled. During operation of the blades, due to the superpositions of static and alternating or vibrating loads, and also thermal loads, however, overall loads frequently also occur, which exceed the maximum permissible material load. As a result of this, as with exceeding the maximum permissible vibration frequency, crack formations can especially occur, particularly in the blade root, as a result of which exchanging the affected blade is necessary.

The invention should provide a remedy for this. By means of the invention, the mean tensile stresses which effectively act upon a blade root during operation can be reduced, as a result of which the fatigue life of the blade root is increased.

With the blade roots which are formed as inverted T-roots and shown in FIGS. 1 and 2, this is achieved by a mechanical stress field being impressed in one machining step in each case in the notch roots 5a and 5b of the slots 4a and 4b of the blade roots 3 which are shown in FIGS. 1 and 2, at least within one section of the relevant slot 4a or 4b, wherein the impressed mechanical stress field brings about a plastic deformation of the notch roots 5a, 5b of the slots 4a and 4b in the impacted section. The impressed mechanical stress field is then progressively moved in the slot longitudinal direction of the respective slot 4a and 4b. If the slot 4a or 4b is machined in this way over its entire length, then the impressed mechanical stress field is removed again, wherein, however, residual compression stresses remain in the notch root 5a or 5b of the slot 4a or 4b.

In FIGS. 1 and 2, impressing tools, which are suitable for implementing the method according to the invention, are shown in addition to the blades 1.

The impressing tools in this case are constructed in each case as impressing wheels 6I and 6II, which, for producing the mechanical stress field, are pressed on the circumferential side into the respective slot 4a and 4b of the relevant blade root 2.

The impressing profile 7I of the impressing wheel 6I which is shown in FIG. 1 is trapezoidally formed, and comprises a broad trapezium base side 7I-3, a narrow trapezium base side 7I-4, and also two trapezium sides 7I-1 and 7I-2. The free angles 7I-W and 7I-2W between the trapezium sides 7I-1 and 7I-2 and the narrow trapezium base side 7I-4, are preferably about 60° to 80°. When pressing the impressing wheel 6I into the slot which is to be machined, the trapezium sides 7I-1 and 7I-2 come to bear on the slot shoulders 5a1 and 5a2, or 5b1 and 5b2, of the slots 4a or 4b. If, for impressing the mechanical stress field, the impressing wheel 6I is now pressed with a defined impressing force into the slot 4a according to the arrow direction 8 which is shown in FIG. 1, then the trapezium sides 7I-1 and 7I-2 come to bear upon the slot shoulders 5a1 and 5a2 of the slot 4a, and in the process introduce the impressing force into the notch root 5a of the slot. As a result of this, the slot 4a is spread, in conjunction with a plastic deformation of the notch root 5a. After removing the impressing wheel 6I, a residual compression stress field remains in the notch root 5a which is again in the relieved state. These embodiments also equally apply to the further slot 4b which is shown in FIG. 1.

The impressing profile 7II of the impressing wheel 6II which is shown in FIG. 2, however, is formed basically similar in contour to the contours of the slots 4a and 4b. On the level of the equator of the impressing wheel 6II, the impressing profile 7II, however, additionally has an impressing projection 7II-1 which, when pressing in the impressing wheel 6II, comes to bear in the notch root of the slot 4a or 4b. By means of this impressing projection 7II-1, the force introduction of the impressing force into the relevant notch root 5a or 5b is carried out largely in a spot-focused or localized manner, as the case may be.

If the impressing wheel 6II which is shown in FIG. 2 is pressed with a defined impressing force into the slot 4a according to the arrow direction 8 which is shown in FIG. 2, then the impressing wheel 6II comes to bear with its impressing projection 7II-1 in the notch root 5a of the slot 4a. The impressing force is accordingly locally introduced via the impressing projection 7II-1 into the notch root 5a, as a result of which a plastic deformation of the notch root, similar to a deep-drawing process, occurs. In the relieved state, a residual compression stress field remains in the notch root 5a. These embodiments equally also apply to the further slot 4b which is shown in FIG. 2.

Figure 3:
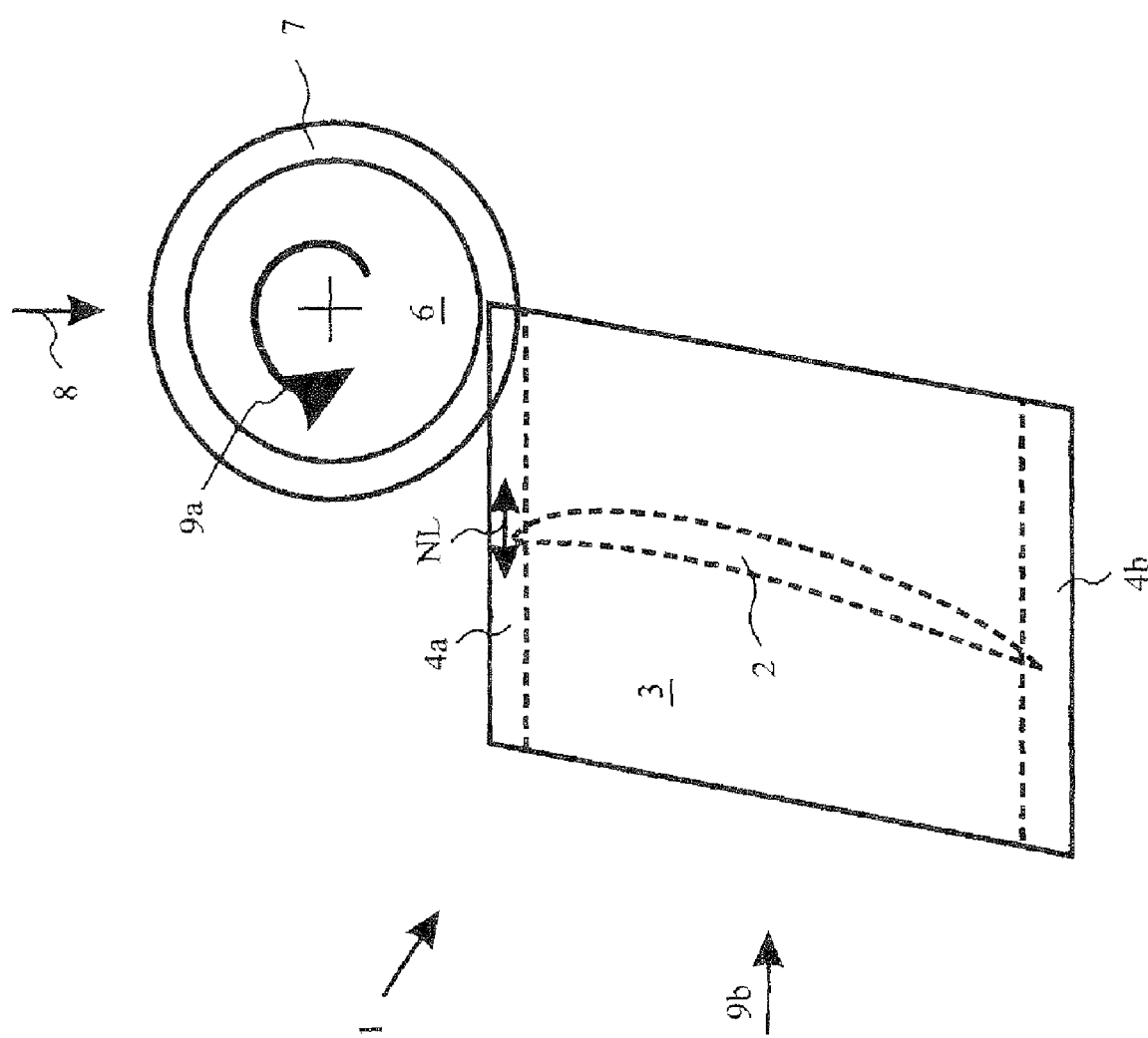
FIG. 3 shows the course of movement of the impressing tools or of the blade roots, as the case may be, which is shown in FIGS. 1 and 2, during the implementing of the method according to the invention.

In order to progressively move the mechanical stress fields, which are produced by pressing in of the impressing wheels 6I and 6II which are shown in FIGS. 1 and 2, in the slot longitudinal direction of the relevant slot 4a or 4b in each case, the impressing wheels 6I and 6II are progressively moved by means of rolling or revolving along the respective slot 4a or 4b. For this purpose, FIG. 3 illustrates the courses of movement of the impressing wheels 6I and 6II which are shown in FIGS. 1 and 2 in relation to the respective blade root 3. While the impressing wheel 6 (in FIG. 1: 6I, in FIG. 2: 6II) rotates around its rotational axis (see rotation arrow 9) with a constant effective direction 8 of the impressing force, the blade 1 together with the blade root 3 is translationally displaced in the slot longitudinal direction NL according to the movement arrow 9b in FIG. 3. Translation of the blade 1 and rotation of the impressing wheel 6 in this case are matched to each other so that no slip of the impressing wheel 6 occurs.

As shown in FIG. 3, in this case it is expedient to start the rolling process at one end of the respective slot 4a or 4b and to finish the rolling process at the other end of the slot. In principle, however, any other starting point and finishing point within the slot is also conceivable. By the same token, the slot can also be repeatedly rolled-through by the impressing tool.

As a result of the induced residual compression stress field, it is apparent that a blade root which is machined in this way in accordance with the method according to the invention, has a higher fatigue life and, furthermore, also a higher endurance limit at complete stress reversal than a conventionally machined blade root. The blade can accordingly remain longer in operation without it having to be exchanged or overhauled. The blade root which is machined according to the invention can also be loaded with a higher cyclic load.

Figure 4:
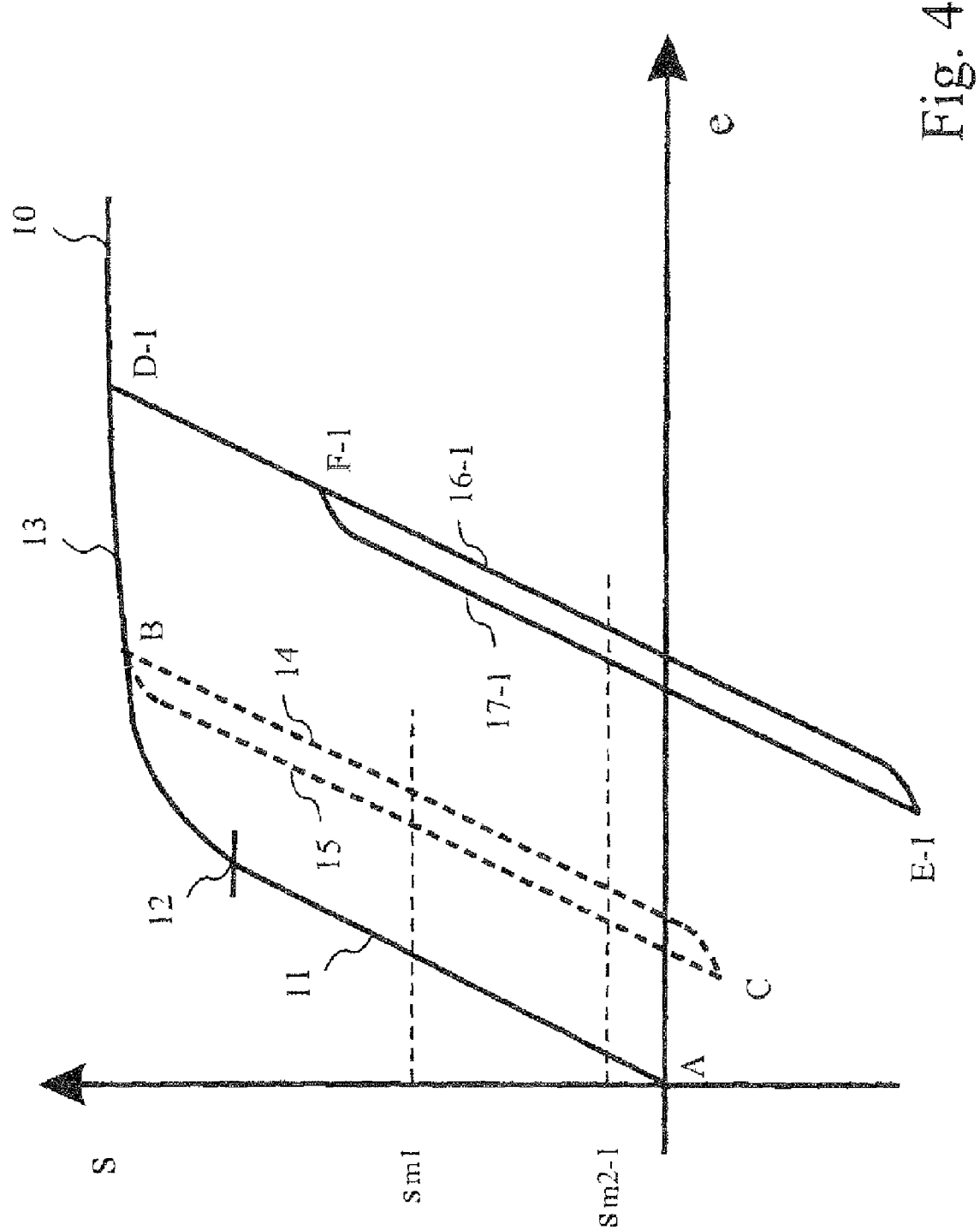
FIG. 4 shows in a stress-strain diagram the residual compression stress field which is achieved by means of the impressing tool from FIG. 1.
Figure 5:
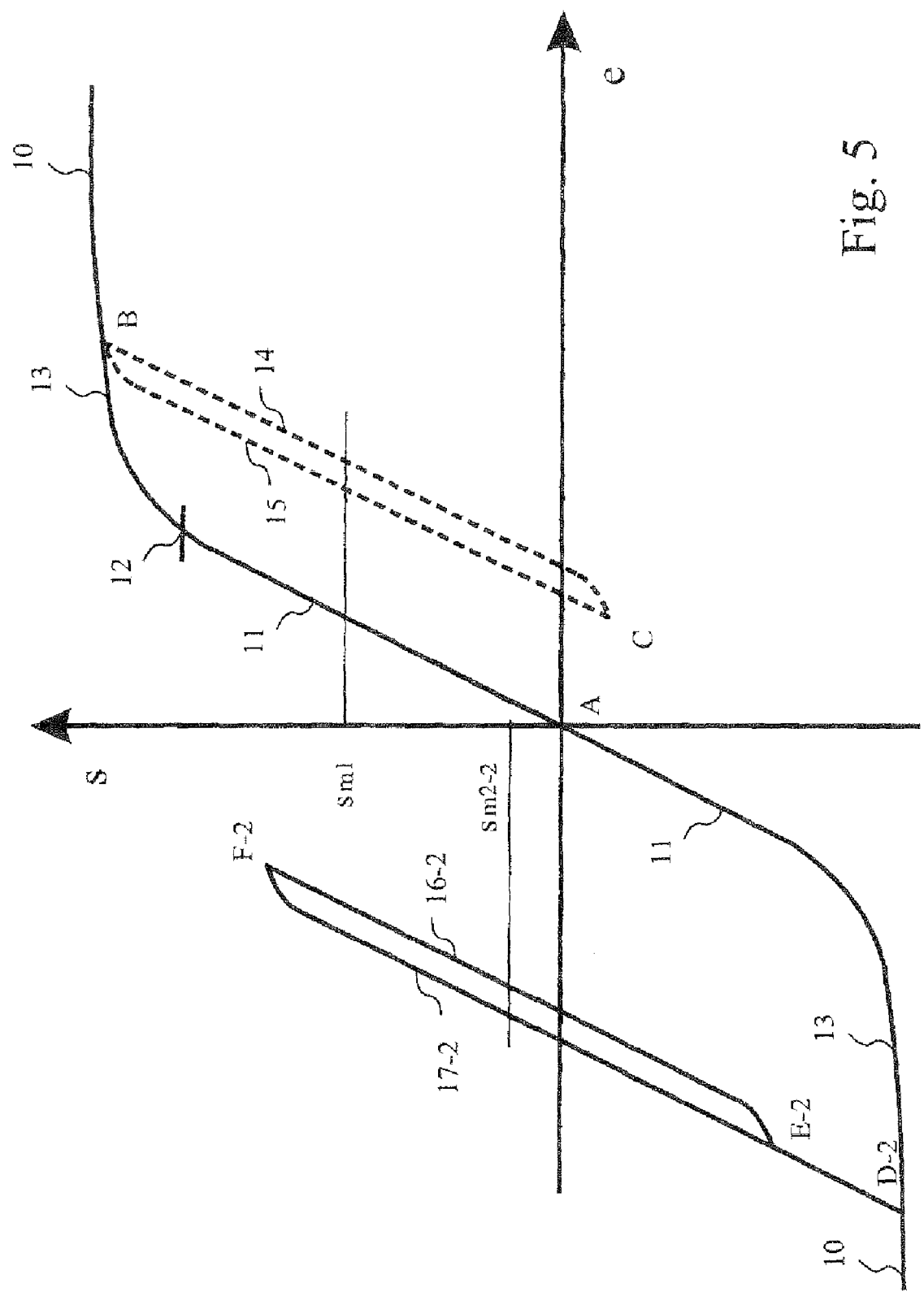
FIG. 5 shows in a stress-strain diagram the residual compression stress field which is achieved by means of the impressing tool from FIG. 2.

In FIGS. 4 and 5, stress-strain diagrams are shown for illustration of the achieved effect.

FIG. 4 illustrates how alternating or vibrating loads, which occur during operation of the blade, are shown in the stress-strain diagram of the material of the notch root 5a or 5b of the slot 4a or 4b of the blade root 2 from FIG. 1. The stress-strain curve 10 which is shown in FIG. 4 in this case reproduces the strain behavior of the material of the notch root 5a or 5b of the blade root 2 with tensile load. With load for the first time, without previous plastic deformation, the material is first purely elastically deformed along the strain characteristic curve 11. This elastic deformation is carried out linearly to the effective tensile stress s. After a defined load limit value 12, a plastic deformation of the material also occurs in addition to the elastic deformation of the material. The stress-strain curve 10 extends from here non-linearly and flatter (stress-strain characteristic curve in region 13).

If, during operation of the blade, the material of the notch root of a conventional blade root, which was not machined in accordance with the method according to the invention, is now loaded by an alternating or vibrating load, with a defined maximum stress which lies above the limit value 12 of the purely elastic deformation, then the load curve B-C, which is shown by a broken line in FIG. 4, is established. A deformation of the material up to point B first occurs along the stress-strain curve 10. From here, the alternating or vibrating load decays again along the line 14, and upon falling below the zero stress line changes from a tensile load to a compressive load. At the minimum point C of the alternating or vibrating load, a reversal of the load is carried out again. The load subsequently increases along the line 15 up to the maximum point B again. Altogether, an alternating or vibrating stress is thus produced around a stress mean value $s_{m1}$. Within the scope of the further description, this load cycle forms the reference load case.

If the slots of the blade root were previously machined in accordance with the method according to the invention, then a lower stress mean value, $s_{m2-1}$ in FIG. 4 or $s_{m2-2}$ in FIG. 5, is produced with the same cyclic load of the material of the notch root.

As explained above, in the method according to the invention a mechanical stress field is impressed in the notch roots 5a or 5b of the slots 4a and 4b of the respective blade root 2 by means of pressing in of the respective impressing wheel 6I or 6II, as a result of which a plastic deformation is brought about in the relevant notch root 5a or 5b.

If the impressing wheel 6I which is shown in FIG. 1 is used as the impressing tool, than a stress-strain state, which corresponds to point D-1 of the stress-strain curve 10 in FIG. 4, is established in the material of the notch root 5a or 5b during pressing in of the impressing wheel 6I. The formation of a tensile stress according to point D-1 is caused by the impressing wheel 6I coming to bear with the trapezium sides 7I-1 and 7I-2 on the slot shoulders 5a1 and 5a2, or 5b1 and 5b2, of the slots 4a and 4b, and the slots being spread as a result of the impressing force which is introduced in this way. The tensile stress, which is brought about in the relevant slot as a result of this, leads to a plastic tensile deformation of the notch root 5a or 5b according to point D-1 in FIG. 4. After removing the impressing force, a residual compression stress, which corresponds to point E-1, is then established in the relieved state on account of the remaining plastic deformation in the notch root 5a or 5b. This residual compression stress lies below the zero stress line and so forms a negative offset, as it were, with regard to tensile stresses which are subsequently introduced in the notch root.

If, during operation of the blade, the blade root 3 which is machined in this way according to the invention is now loaded by an alternating or vibrating load with the same maximum tensile stress as in the reference load case which is described above, then the continuously drawn load curve E-1-F-1 is established. The stress mean value $s_{ms-1}$ which results from this lies significantly lower than the stress mean value $s_{m1}$ in the reference load case B-C. The material of the notch root is loaded correspondingly less, as a result of which the fatigue life of the blade root is increased. Like in the case of a surface treatment by shot-peening, however, as a result of this the endurance limit at complete stress reversal is additionally also increased.

If the impressing wheel 6II which is shown in FIG. 2 is used as the impressing tool, then a stress-strain state, which corresponds to point D-2 of the stress-strain curve 10 in FIG. 5, is established in the material of the notch roots 5a or 5b during pressing in of the impressing wheel 6II. This is caused by the impressing wheel 6II, which is shown in FIG. 2, being pressed, during pressing in, via the impressing projection 7II-1 into the respective notch root 5a or 5b of the slot 4a or 4b. As a result of this, a stress corresponding to point D-2 is impressed in the notch root 5a or 5b. After removing the impressing force, a remaining residual compression stress according to point E-2 in FIG. 5 is established in the relevant notch root 5a or 5b in the relieved state. This residual compression stress also lies significantly below the zero stress line and so forms a negative offset, as it were, with regard to tensile stresses which subsequently occur.

If, during operation of the blade, the blade root which is machined in this way is now loaded by an alternating or vibrating load with the same maximum tensile stress as in the reference load case which is described above, then the continuously drawn load curve E-2-F-2 is established. The stress mean value $s_{m2-2}$ which results from this lies significantly lower than the stress mean value $s_{m1}$ in the reference load case B-C. The material of the notch root is loaded correspondingly less, as result of which the fatigue life of the blade root is increased. Like in the case of a surface treatment by shot-peening, however, as a result of this the endurance limit at complete stress reversal is additionally also increased.

In order to achieve an optimum residual compression stress field in the notch root of the blade root, the impressing force is to be selected in dependence upon the maximum cyclic load of the blade root, and also upon the material of the blade root and the contour of the impressing tool.

It has become apparent that it is expedient with a blade root which is produced from a nickel-based alloy to deform the notch root of the slot by means of the impressed stress field in a range of between 5% and 12% of plastic strain.

If the blade root is produced from a titanium alloy, then it is expedient to deform the notch root of the slot by means of the impressed stress field in a range of between 4% and 8% of plastic strain.

The method according to the invention is especially also characterized in that it cannot only be used during the production of blades, but that blades which were already in operation can also be machined in accordance with the method according to the invention. The deformations of the slot geometry which are brought about by application of the method are so slight that no further machining of the blade root for compensating geometry changes is necessary. This, for example, in comparison to a coating of the blade root, represents a significant advantage, especially with blades which are not newly produced but only overhauled. Due to coating of the blade root, the external dimensions of the blade root would be altered so that machining of the blade root before coating, or machining of the recess which accommodates the blade root, would be necessary for compensating the geometry change as a consequence of the coating. As a result of this, the costs for such service life extending measures would be significantly increased. The method according to the invention makes pre-treatment or aftertreatment of the blade root, or of the recess of the shaft component or casing component, for compensating geometry changes unnecessary.

The method according to the invention, and also the impressing tools which are shown in FIGS. 1 and 2, only represent exemplary embodiments of the invention, which can be perfectly modified in a diverse manner by a person skilled in the art without abandoning the inventive idea. In this way, for example a combination of the method according to the invention with other methods which are known from the prior art for inducing residual compression stresses and for increasing the endurance limit at complete stress reversal, or other measures which increase the service life of the blades or blade roots, like, for example, hardening of the surfaces, is possible and, if applicable, expedient.

What is claimed is:

1. A method for increasing the fatigue life of a blade root of a turbomachine blade, the blade root having at least one longitudinal slot for back-gripping fixing of the blade root in a shaft component or a casing component of a turbomachine, the method comprising:

impressing a mechanical stress field in a notch root of the slot in a section of the slot using an impressing tool having a trapezoidally formed impressing profile with trapezium sides that come to bear upon slot shoulders of the slot during the impressing process so as to bring about a plastic deformation of the notch root;

progressively moving the mechanical stress field in a slot longitudinal direction of the slot; and removing the mechanical stress field, wherein residual compression stresses remain in the notch root in regions of the slot in which the mechanical stress field was impressed.

2. The method as recited in claim 1, wherein the progressively moving the mechanical stress field includes moving the mechanical stress field over the entire length of the slot.

3. The method as recited in claim 1, wherein the impressing the mechanical stress field includes pressing the impressing tool into the slot with a defined impressing force.

4. The method as recited in claim 3, wherein the defined impressing force is determined in dependence upon a maximum cyclic load of the blade root, upon a material of the blade root and upon the profile of the impressing tool.

5. The method as recited in claim 1, wherein the progressively moving of the mechanical stress field includes at least one of rolling and revolving the impressing tool.

6. The method as recited in claim 1, wherein the impressing tool includes an impressing wheel.

7. The method as recited in claim 1, wherein the blade root includes a nickel-based alloy, and the plastic deformation of the notch root is between 5% and 12% of a proportional dimensional change of the notch root.

8. The method as recited in claim 1, wherein the blade root includes a titanium alloy, and the plastic deformation of the notch root is between 4% and 8% of a proportional dimensional change of the notch root.

9. The method as recited in claim 1, wherein the method is performed as part of an overhaul of the turbomachine blade.

* * * * *